July 21, 1936.  F. W. MOORE  2,048,078
MILK COOLER AND AERATOR
Filed April 25, 1935  4 Sheets-Sheet 1

Inventor
Frank W. Moore.
By Lacey & Lacey, Attorneys

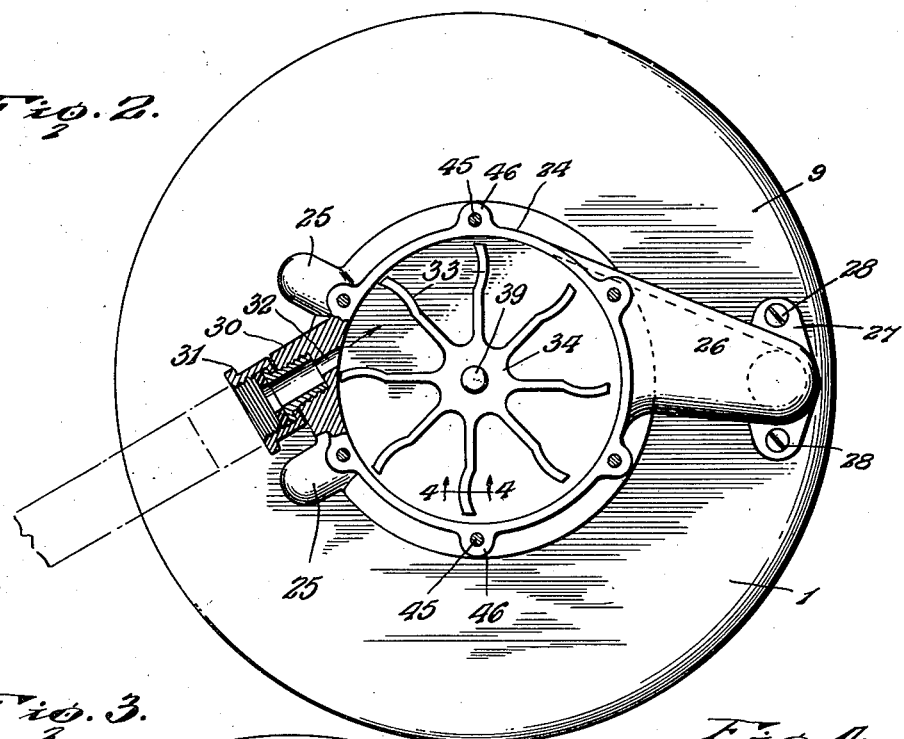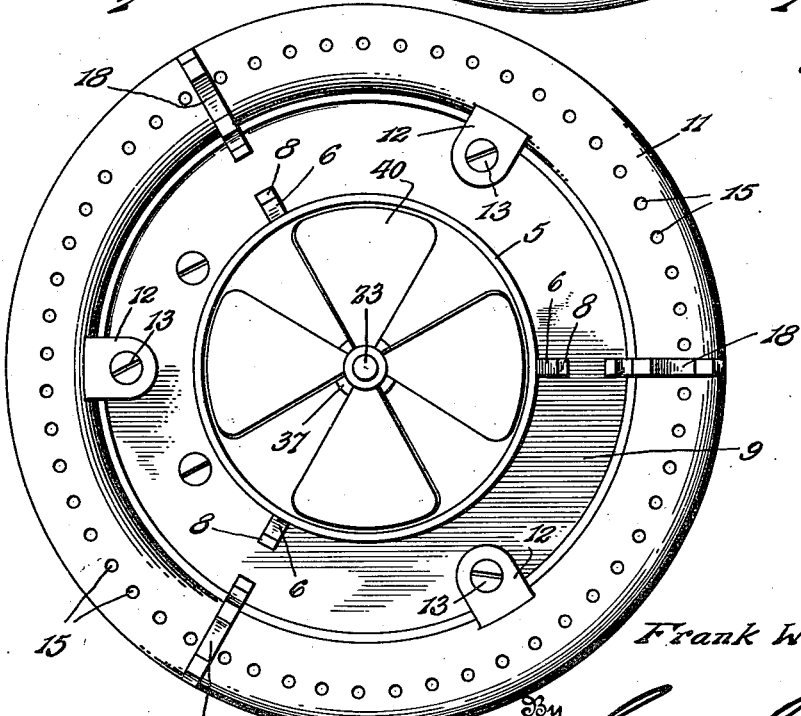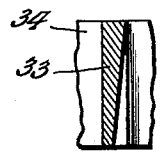

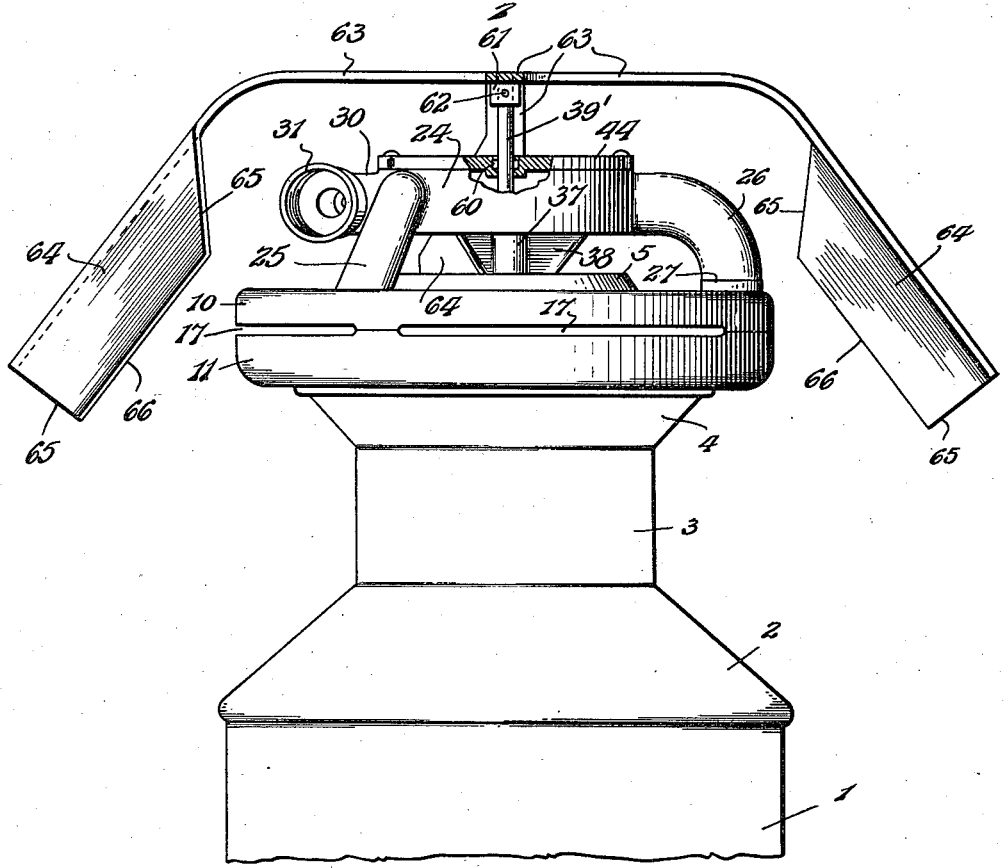
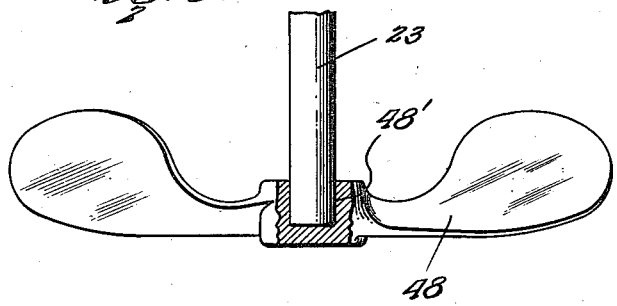
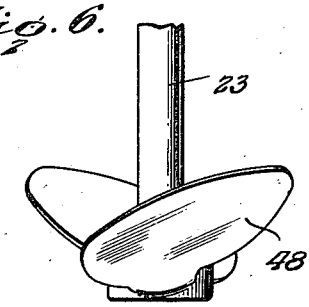

July 21, 1936.  F. W. MOORE  2,048,078
MILK COOLER AND AERATOR
Filed April 25, 1935  4 Sheets-Sheet 4

Inventor
Frank W. Moore.

By Lacey+Lacey, Attorneys

Patented July 21, 1936

2,048,078

UNITED STATES PATENT OFFICE 2,048,078

MILK COOLER AND AERATOR

Frank W. Moore, Lennon, Mich.

Application April 25, 1935, Serial No. 18,241

11 Claims. (Cl. 31—4)

This invention relates to an improved cooler and aerator adapted to be applied to a can of the type in which milk is shipped by the producer, and one object of the invention is to provide a device of this character which may be readily applied to a milk can of a standard construction and cause milk in the can to be quickly cooled and also aerated while being cooled.

Another object of the invention is to provide a device of this character having an improved form of sprinkling head from which water is discharged in a curtain about the neck of a liquid can for external cooling of the can, the sprinkler head or trough being so formed that if too much water accumulate in the trough due to excessive pressure, the surplus water may escape from side portions of the trough and thus indicate that the pressure should be reduced and also prevent damage by the excess pressure.

Another object of the invention is to so form the device that it may be applied to milk cans having either large, small or medium size necks and be firmly held in place when applied to a milk can.

Another object of the invention is to provide a device of this character which may be formed in cast sections and thus cheaply produced.

The invention is illustrated in the accompanying drawings, wherein

Figure 2 is a view taken along the line 2—2 of Figure 1.

Figure 3 is a view taken along the line 3—3 of Figure 1 and showing the sprinkler head and can engaging portion of the device in bottom plan.

Figure 4 is a fragmentary sectional view through the turbine wheel of the device taken along the line 4—4 of Figure 2.

Figure 5 is an enlarged view of the lower portion of the agitator.

Figure 6 is a view taken at right angles to Figure 5.

Figure 10 is a side elevation illustrating another modified construction.

The milk can, which is indicated in general by the numeral 1, is of a standard construction and is formed with the tapered upper portion 2 terminating in a neck 3 having a flared mouth 4. This can may be of any capacity desired and is of the type usually used upon dairy farms for storing milk and shipping the milk.

Figure 1:
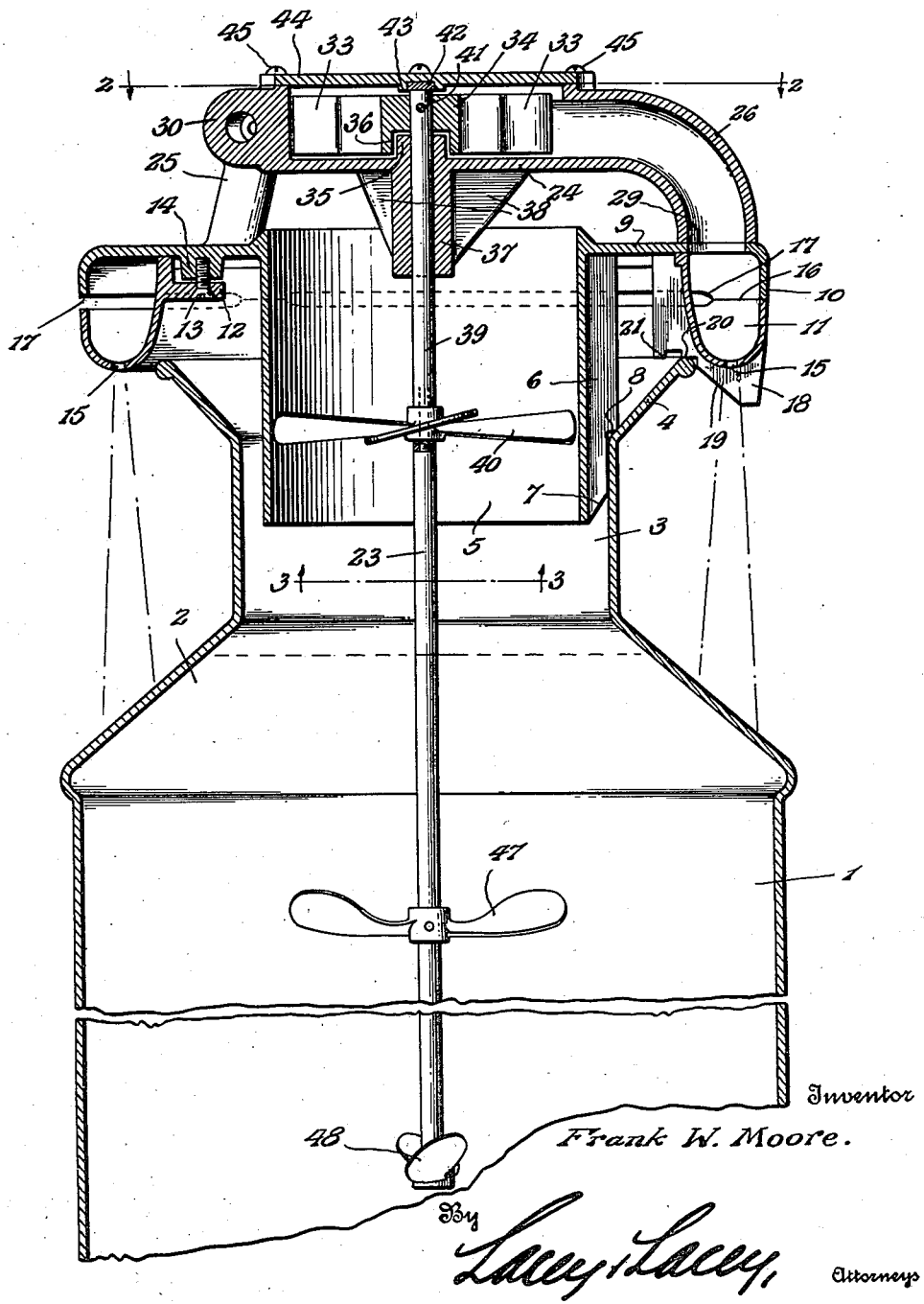
Figure 1 is a sectional view, taken vertically through the improved cooler and aerator and showing it applied to a milk can.

The cooling and aerating device, which has been shown applied to the milk can in Figure 1, has a neck or sleeve 5 which fits within the neck of the can, and about its walls carries ribs 6 which extend longitudinally of the sleeve and project radially therefrom. Lower ends of the ribs are beveled, as shown at 7, so that the ribs may easily move downwardly into the neck of the milk can, and in spaced relation to their lower ends. The ribs are formed with shoulders 8 which are intended to rest upon the mouth 4 directly above the neck 3 and hold the sleeve in its proper position within the neck of the milk can.

Figure 9:
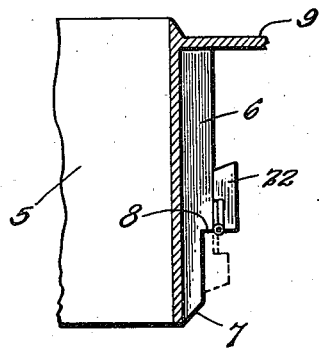
Figure 9 is a fragmentary view of a slightly modified form of can engaging means.

A disc or head 9 is formed integrally with the sleeve 5 and about its outer margin has a downturned annular flange 10 forming an upper portion for the outer wall of a trough 11. This trough 11, which is of annular formation, as shown in Figure 3, is cast separate from the head 9 and has its inner wall of greater height than its outer wall so that when the trough is applied to the head 9 with the upper edge of its inner wall abutting the underface of the head, the outer wall of the trough will be disposed directly beneath and, in effect, form a continuation of the flange 10. Lugs 12 extend from the inner wall of the trough and through these lugs are passed screws 13 which are engaged in threaded sockets formed in bosses 14 which depend from the head 9. It will thus be seen that the trough will be securely but detachably held in place and can be removed when cleaning or repairs are necessary. Outlet openings 15 are formed in the bottom of the trough in spaced relation to each other circumferentially thereof and, therefore, water will be discharged from the trough in the form of a curtain which surrounds the neck of the can and upon striking the sloping portion 2 of the can will flow downwardly along the walls of the can and cause the can to be externally chilled by the flowing water. It should also be noted that at points about its circumference, the trough has upstanding ribs 16 which bear against companion portions of the flange 10. Therefore, portions of the outer wall of the trough between the ribs 16 will be spaced from the overhanging portions of the flange 10 and thus define slots 17 through which water may escape if too much accumulates in the trough. This not only permits surplus water to escape, but also serves as visible means for indicating that the water supply should be reduced. Fins 18 extend vertically of the inner wall of the trough and across the bottom of the trough radially thereof and since each fin has a diagonally extending edge face 19 and a shoulder 20, these fins may engage the outer marginal edge of the flared mouth 4 of the milk can and cause the device to be properly seated and held in a substantially horizontal position. The shoulder 20 of each fin has also been formed with a notch or recess 21 into which the marginal edge of the mouth of the can may fit if it is of the proper dimensions. If so desired the ribs 8 may be provided with auxiliary blocks 22 which are hinged to the ribs above the shoulders 8 and adapted to be swung from the raised position shown in full lines in Figure 9 to the lowered position indicated by dotted lines in this figure. When the auxiliary blocks are swung downwardly to a position for use, they may fit within the neck of a can having a neck of greater than the usual diameter and bear against the walls of the neck of the can to hold the sleeve 5 in its proper position concentric to the neck of the can. When the blocks are swung upwardly they will be out of the way and will not interfere with insertion of the sleeve into a can having a neck of the usual diameter.

In order to supply water to the trough and impart rotary motion to an agitator shaft 23 which extends vertically in the milk can, there has been provided a motor housing or casing 24 which is disposed above the sleeve 5 in vertical spaced relation thereto and has supporting legs 25 which rest upon the head 9 at one side of the sleeve 5. At the other side of the sleeve, the motor casing is formed with a discharge neck 26 which leads from the peripheral wall of the casing and curves downwardly with its lower end formed with side ears 27 through which screws 28 are passed to securely hold the neck upon the head 9 in registry with an opening 29 through which water is to flow into the trough. An inlet 30 for the water extends from the peripheral wall of the casing between the feet 25 and carries a coupling 31 by means of which a hose may be connected with the inlet so that water from a spigot or other source of supply may be fed into the casing. It should be noted that the inlet extends diagonally, as shown in Figure 2, and has a reduced inner end portion 32 so that the water will be fed into the casing in the form of a strong stream which moves circumferentially of the casing toward the discharge 26 and upon striking the blades 33 of a rotor 34 will impart rotary motion to the rotor.

The rotor fits loosely in the housing about a boss 35 which rises from the center of the housing or casing and is engaged in a pocket 36 formed in the hub of the rotor and upon referring to Figure 1 it will be seen that the boss 35 constitutes an extension of a sleeve or bearing 37 which extends downwardly from the bottom of the casing and is braced by fins 38. The bearing 37 and boss 35 serve as a mounting for a drive shaft 39 which carries a fan 40 at its lower end to which the upper end of the agitator shaft 23 is connected. The upper end portion of the drive shaft extends through the hub of the rotor where it is secured by a pin 41 and the upper end of the drive shaft projects slightly above the rotor and is rounded so that friction will be reduced between the drive shaft and the thrust bearing or abutment 42 against which the upper end of the drive shaft bears. This bearing 42 is in the form of a disc of very hard metal which is set into a boss 43 formed at the center of the lid or cover 44 of the casing 24, and referring to Figures 1 and 2 it will be seen that the cover is detachably held in place by screws 45 which pass through marginal portions of the cover and are threaded into sockets 46 formed about the peripheral wall of the casing. The blades 33 of the rotor have their outer end portions curved longitudinally, as shown in Figure 2, and formed with sloping side faces, as shown in Figure 4, so that when the stream of water strikes these blades it will not only impart rotary motion to the rotor and the drive shaft, but also have a tendency to shift the rotor and drive shaft upwardly and hold the rounded upper end of the shaft in engagement with the bearing plate 42. Therefore, the shaft will be rapidly rotated by the moving water and it will be held in its proper position during rotation.

When this cooler and aerator is in use, it is applied to a milk can, as shown in Figure 1, with the sleeve 5 extending into the neck of the can and the fins 18 resting upon the upper marginal edge of the mouth 4 of the can. The agitator shaft which carries agitating propellers 47 and 48 extends vertically in the can for approximately two-thirds the depth thereof with the propeller 48 at its lower end and the propeller 47 spaced upwardly therefrom and extending transversely of the propeller 48. The lower propeller is formed with a socket 48' into which the lower end of the shaft 23 tightly fits when the propeller is applied and shrunken into place and, if desired, solder may be applied at the top of its hub about the shaft to fill cracks and prevent germs accumulating in the joint. The upper propeller may also be shrunken into place about the shaft and pinned to the shaft if thought necessary. It will be noted from an inspection of Figures 1, 5, and 6 that blades of the propellers are so pitched transversely and longitudinally that when the shaft is rotating the milk will be thoroughly agitated and milk at the center of the can will move upwardly and then spread toward walls of the can and move downwardly in the can. Hot vapors will be given off from the milk at the top of the can and as the milk moves downwardly near the walls of the can, air will be carried downwardly and mixed with the milk to aerate it. Rotary motion is imparted to the agitator shaft from the drive shaft 39 which, in its turn, is rotated with the rotor 34 and rotary motion is imparted to the rotor by water passing through the casing 24. This water passes from the discharge 26 of the casing into the trough about which it flows and escapes through the openings 15 in the form of a descending curtain of water which strikes the sloping portion 2 of the can and then flows downwardly along the walls of the can. Therefore, the walls of the can will be cooled and the downwardly moving milk within the can will be cooled by contact with the chilled walls of the can. It should also be noted that as the drive shaft rotates, the fan 40 will drive air upwardly through the neck 5 to carry off with it vapors rising from the milk and during this operation, air will be drawn inwardly between the trough and the margins of the mouth of the can. The incoming air passes through the curtain of water so that it is moistened and this moistened air passes downwardly through the neck of the can about the sleeve 5 before passing upwardly through the sleeve. Moistened air has good heat absorbing qualities and will also absorb odors from the hot gases caused by certain types of vegetation eaten by the cows. The only portion of this device which enters the milk is the agitator shaft and the blades carried thereby and, therefore, only this shaft and its blades have to be sterilized. It only takes a very short time to cool the milk of a filled can and after the cooling operation has been completed, the device can be very easily removed and a cover applied to the can. If the faucet from which the hose extends has been opened too far so that the water enters the casing under too much pressure, the trough will be filled to such an extent that water will flow out through the slots 17 thus relieving excess pressure in the trough and also indicating to the attendant that the faucet should be adjusted in order to properly regulate the flow of water.

Figure 7:
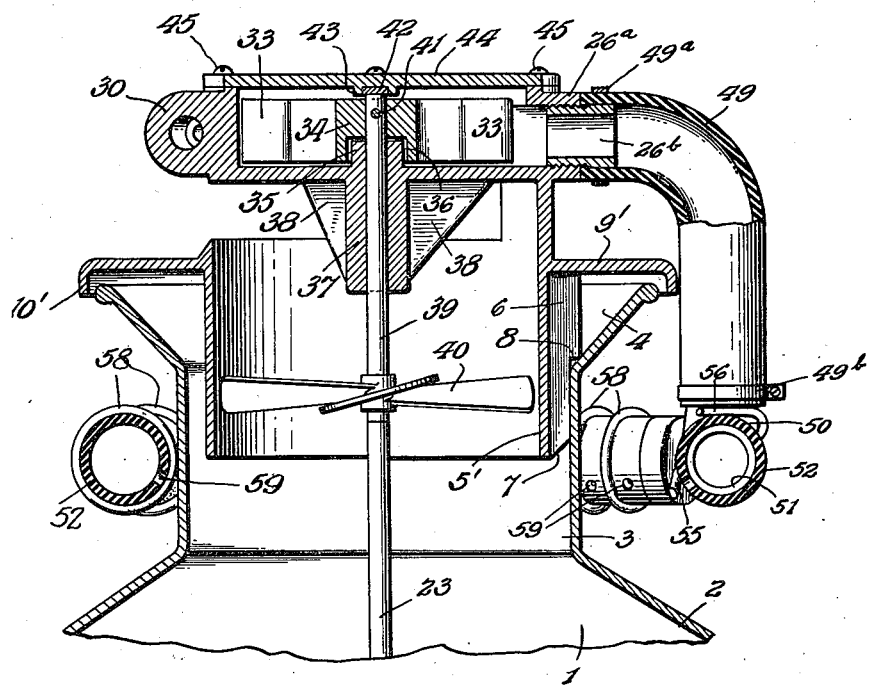
Figure 7 is a view similar to Figure 1 of a modified form of cooler and aerator.
Figure 8:
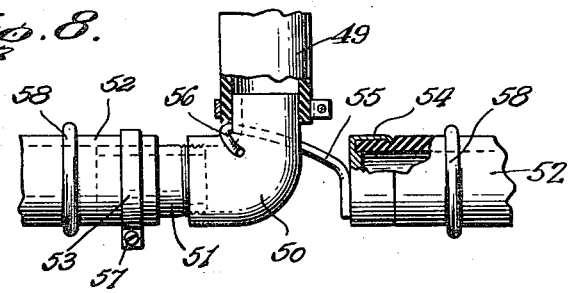
Figure 8 is a fragmentary view illustrating the manner in which the flexible pipe shown in Figure 7 is held about the neck of the milk can.

In Figures 7 and 8, there has been shown a modified construction, but as certain elements correspond to those shown in Figures 1, 2, and 3, the same reference numerals have been used for these parts. The head or disc 9' which takes the place of the disc 9 is of less diameter than the disc 9, and the sleeve 5' which takes the place of the sleeve 5 is of less depth than the sleeve 5 so that when the sleeve is fitted into the neck of the can, the head or disc 9' will be disposed in close but spaced relation to the marginal edge of the mouth 4 with a depending flange 10' encircling the marginal edge of the mouth of the can. The trough is eliminated and the discharge spout 26ª is of less length than the discharge spout 26. A flexible tube 49 has its upper end secured about a nipple 26ᵇ by a clamp 49ª and this tube extends downwardly below the flange 10' in radial spaced relation to the neck of the can and has its lower end secured about an elbow 50 by a clamp 49ᵇ. The elbow extends circumferentially of the can and carries a nipple 51 about which one end of a rubber hose 52 is applied and secured by a clamp 53, as shown in Figure 8. This rubber hose is of sufficient length to extend loosely about the neck of the can and at its other end is closed by a metal cap 54. This end portion of the hose also carries a hook 55 which is formed of stiff wire and may be brazed to the cap 54 or secured about the hose in any desired manner and extends from the hose longitudinally thereof so that, after the hose has been passed about the neck of the can, the bill 56 of the hook may be engaged about the elbow 50 to retain the hose in its proper position about the can. If so desired the bill of the hook can be engaged through an eye 57 carried by the clamp 53 or about the attached end of the hose. Ribs 58 are formed circumferentially about the hose in spaced relation to each other longitudinally thereof and between these ribs the hose is formed with outlet openings or perforations 59 through which streams of water will be discharged toward the neck of the can. It will be readily seen from an inspection of Figure 5 that the ribs hold the hose in such spaced relation to the neck of the can that the outlets 59 will not be obstructed and, therefore, water may flow freely through these outlets. The operation of this form is the same as previously described and, therefore, need not be set forth in detail.

In Figure 10 there has been shown another modified construction wherein means has been provided for directing air downwardly against the can in order to reduce temperature of the water by evaporation and aid in the cooling. While this attachment for directing air against the can has been shown in connection with a cooler of the type shown in Figures 1, 2, and 3, it will be understood that it could also be used in connection with a device of the construction shown in Figure 7. The elements of Figure 10 which correspond to those shown in Figures 1, 2, and 3 have been designated by the same reference numerals.

In this embodiment of the invention, the shaft 39' is of somewhat greater length than the shaft 39 and has its upper end portion journaled through a bearing 60 at the center of the cap 44. A fan is carried by the upper end of the shaft 39' and is formed with a hub 61 secured upon the shaft by a pin 62. Arms 63 radiate from the hub 61 and have their outer end portions bent to extend downwardly at an outward incline so that they are disposed outwardly from the water distributing trough. Each arm carries a blade 64 which is disposed at an incline to force air downwardly and inwardly toward the can as the fan rotates and it should be noted that each blade has converging side edges 65 and a straight cut free end edge 66. By having the blades so formed, a very effective air current will be created when the fan is in operation and a strong blast of air directed against the curtain of water flowing from the trough and downwardly along the milk can. While the fan has been shown formed with four arms and a corresponding number of blades, it will be understood that any number desired may be used. When the device is provided with this fan it will be very effective in operation as the air directed downwardly by the blades of the fan will first strike the curtain of water flowing downwardly from the trough and then move downwardly along and about the can and tend to reduce the temperature of the water by evaporation and thus cause a rapid cooling of the milk which is circulated in the can.

Having thus described the invention, what is claimed as new is:

1. A milk cooler comprising a sleeve of a diameter to fit within a milk can neck in spaced relation to walls of the neck, fins extending radially from the sleeve for engaging walls of the can neck and supporting the sleeve in spaced relation thereto, a trough supported from said sleeve and adapted to discharge an annular curtain of water on to a can about the neck in spaced relation thereto, a motor casing supported above the sleeve and having a discharge spout leading to said trough, a rotor in said casing, a shaft extending vertically through the sleeve with its upper portion extending into the casing and fixed to said rotor whereby the rotor and shaft will be rotated by water passing through the casing to the discharge spout, and a fan carried by said shaft within said sleeve for drawing air upwardly through the sleeve.

2. A milk cooler comprising a sleeve having longitudinally extending fins projecting radially therefrom for engaging walls of the neck of a container and supporting the sleeve in spaced relation to walls of the neck, a casing mounted over said neck, a fan in said neck having a shaft extending upwardly therefrom axially of the neck and journaled through the casing, a rotor carried by the shaft within the casing, an annular distributer mounted in position to extend about the neck of the container and formed with openings for discharging water in an annular curtain about the neck of the container for moistening air passing inwardly through the neck about the sleeve as the fan and shaft are rotated, means for connecting said casing with a source of water under pressure, and an outlet neck for conducting water from the casing to said distributer.

3. A milk cooler comprising a distributer for discharging an annular curtain of water onto walls of a container in spaced relation to the neck of the container, a sleeve of a diameter to fit within the neck of the container, spacing ribs extending radially from the sleeve for engaging walls of the neck and having shoulders for resting upon a portion of the neck and supporting the sleeve in the neck in spaced relation to walls thereof, a casing above the open upper end of said sleeve in spaced relation thereto having an inlet for water and having an outlet for delivering water from the casing into said distributer, a rotor in said casing operated by water passing through the casing, and fluid moving means actuated from said rotor and positioned in cooperating relation with the sleeve to draw air downwardly through the space between the sleeve and the neck and direct the air upwardly through the sleeve.

4. A milk cooler comprising a sleeve of a diameter to fit within the neck of a container, a trough supported from said neck and of a diameter to fit about the upper end of the neck of the container, the trough having longitudinally extending fins projecting inwardly and downwardly therefrom to rest upon the upper edge of the neck of the container and space the trough from the neck, said sleeve having longitudinally extending ribs projecting radially therefrom to engage walls of the neck of the container and assist the fins in supporting the sleeve and trough, the ribs also serving to hold the sleeve spaced from the neck whereby air may pass inwardly between the trough and neck and downwardly through the neck about the sleeve, said trough having perforations for discharging water in an annular curtain about the neck of the container, a casing supported above the open upper end of said sleeve in spaced relation thereto and having an inlet for water under pressure and an outlet communicating with the trough, a rotor in said casing rotated by water passing through the casing, a shaft for said rotor extending downwardly through the casing and into said sleeve, and a fan carried by said shaft within the sleeve.

5. A milk cooler comprising a sleeve of a diameter to fit within the neck of a receptacle, an annular disc formed integral with the upper end portion of said sleeve and having a depending flange about its outer marginal edge, an annular trough having outlet openings in its bottom and having a short outer wall disposed under the flange of said disc and a deep inner wall having its upper edge bearing against the under face of the disc, portions of the adjoining edges of the flange and outer wall of the trough being spaced from each other to provide overflow openings for the trough, ears extending from the inner wall of said trough, removable fasteners passed through the ears for detachably securing the trough to said disc, an inlet opening for the trough being formed in the disc above the trough, a motor casing disposed above the upper end of said sleeve, feet carried by said casing and detachably secured upon said disc, an outlet spout extending from said casing and detachably secured to said disc about the inlet opening of the trough, an inlet extending from the casing between said feet, a coupling carried by the inlet, a bearing depending from said casing with its upper portion projecting into the casing, a rotor in the casing having its under face formed with a recess receiving the upper end of said bearing, a drive shaft journaled through the bearing and extending upwardly through the rotor, the rotor being secured to the drive shaft, a removable cap for said casing having a thrust bearing engaged by the upper end of the drive shaft, and a fan carried by the drive shaft within said sleeve.

6. A milk cooler comprising a sleeve of a diameter to fit within the neck of a milk can, an annular head formed integral with the sleeve adjacent the upper end thereof and having a depending flange about its outer margin, an annular trough detachably secured to the annular head with its outer wall in abutting relation to the flange, the trough having discharge openings in its bottom and portions of the flange and outer wall of the trough being spaced from each other to form overflow openings, ribs carried by the sleeve and projecting radially therefrom and formed with shoulders in spaced relation to their lower ends for resting upon the flared mouth of a milk can over the neck thereof and holding the sleeve in concentric spaced relation to the walls of the neck, fins extending transversely of said trough and projecting from the bottom and inner wall thereof to rest upon the outer marginal portion of the mouth of the milk can whereby air may pass inwardly between the trough and mouth of the can and downwardly through the neck about the sleeve, a motor casing supported over said sleeve in spaced relation thereto and having an inlet adapted for connection with a source of water and an outlet communicating with said trough, a rotor in said casing, a driven shaft extending axially through said sleeve with its upper end portion journaled in the casing and fixed to the rotor, a fan carried by said shaft within said sleeve, and an agitator having a shaft connected with the lower end of said driven shaft.

7. In a milk cooler, a sleeve adapted to be supported in the neck of a milk can concentric thereto and having radiating ribs for maintaining the sleeve in spaced relation to walls of the neck, a trough supported about said sleeve and having radiating fins for engaging the upper edge of a flared mouth of a milk can and spacing the trough outwardly from the mouth of the can whereby air may pass inwardly under the trough and downwardly through the mouth and the neck of a can about the sleeve, said trough having openings in its bottom for discharging an annular curtain of water onto the can to cool the can and moisten air passing inwardly under the trough, a casing having a water inlet and also having a discharge spout communicating with the trough, a drive shaft extending axially in said sleeve with its upper end portion journaled through said casing, a rotor in said casing for imparting rotary motion to the drive shaft, a fan carried by said drive shaft within said sleeve, and an agitator having a shaft alined with the drive shaft and connected to the lower end thereof.

8. A milk cooler comprising a sleeve adapted to be supported in the neck of a milk can in spaced relation to walls thereof, an annular head carried by said sleeve adjacent the upper end thereof, means to support said head in covering but spaced relation to the mouth of a milk can, a casing disposed over the open upper end of said sleeve in spaced relation thereto, a rotor in said casing, a drive shaft extending through said sleeve with its upper portion journaled in said casing and connected with the rotor to rotate therewith, a fan carried by the drive shaft within the sleeve, an outlet spout for said casing projecting beyond the outer margin of said head, a flexible hose having one end connected with the outer end of said spout, a cap closing the other end of said hose, a hook carried by said cap for releasably securing the hose in encircling relation to the neck of a milk can, and ribs extending circumferentially about said hose, the hose being formed with outlet openings disposed between the ribs.

9. A milk cooler including a casing, a drive shaft journaled in said casing and extending downwardly therefrom, a fan carried by said shaft, a rotor in said casing connected with said shaft for imparting rotation thereto, said casing having a liquid inlet and having a discharge spout terminating in a downturned outer end portion, an elbow connected with the lower end of said discharge spout, a flexible hose having one end connected with said elbow and its other end closed, means carried by the last-mentioned end portion of said hose for engaging said elbow and holding the hose in substantially annular formation about the neck of a milk can, said hose having discharge openings formed therein, and means carried by the hose between the discharge openings for holding the hose in spaced relation to the neck of a can.

10. In a milk cooling device, a sleeve of a diameter to fit within the neck of a container in spaced relation to walls of the neck, ribs extending radially from said sleeve for holding the sleeve spaced from walls of the neck, a block adjustably carried by one rib and movable into and out of position to engage the neck of an over-sized container, a distributor for discharging water against the container, a casing above said sleeve having an inlet and having an outlet for delivering water into said distributor, a rotor in said casing operated by water passing through the casing, and a fan in the sleeve actuated from said rotor.

11. A milk cooler including a casing, a drive shaft journaled in said casing and extending downwardly therefrom, a fan carried by said shaft, a rotor in said casing connected with said shaft for imparting rotation thereto, said casing having a liquid inlet and having a discharge spout terminating in a downturned outer end portion, a flexible hose having one end connected with the lower end of said discharge spout and its other end closed, means for holding the hose in substantially annular formation about the neck of a milk can, said hose having discharge openings formed therein for directing liquid against the can, and means for holding the hose in spaced relation to the neck of a can.

FRANK W. MOORE.